Patented June 4, 1935

2,003,314

UNITED STATES PATENT OFFICE

2,003,314

WATER PURIFICATION

Brinton Russell and Cecil B. Russell, Norristown, Pa., assignors to Attapulgus Clay Company, Philadelphia, Pa., a corporation of Delaware No Drawing. Application January 26, 1933, Serial No. 653,750

4 Claims. (Cl. 210—9)

Our invention relates to the art of treating water, and more particularly to a method of purifying water from streams, rivers or other sources of water supply, as for instance, a source from which water for a municipality or an industrial plant is taken. Our process may be employed in lieu of or supplemental to water treating processes now employed, or it may be employed in lieu of or in addition to steps or portions of existing water treating processes. Polluted water, when subjected solely to our treatment, is rendered suitable for many purposes for which theretofore it was not adapted.

When water having such objectionable characteristics as foul odor and taste, and undesirable color is subjected to our treatment, such characteristics are in whole or to substantial extent removed. In addition, as a direct result of our process, other advantages, such as neutralization of acid bodies, reduction in content of suspended matter and ash, and substantial removal of bacteria are gained. Furthermore, coagulation and precipitation of foreign materials from the water is effected and/or aided by our process. When water is treated by our process to reduce or eliminate the objectionable characteristics aforesaid, substantial reduction and sometimes elimination altogether of chemicals in the treatment of the water is effected, with incident economy and savings.

We have found that by bringing polluted water into contact with specially prepared argillaceous materials, a physical and/or chemical action upon the water is effected, so that substantial of its undesirable properties and particularly those above noted, are eliminated or reduced.

The particular argillaceous materials with which, in accordance with our present invention, we bring water into contact, are clays which after having become spent or after having been used in the treatment of carbonizable materials, are subjected to a burning operation. Examples of such materials are those such as have been used in the treatment of hydrocarbon oils for the removal of color, gums, etc. those which have been used in the refining of sugar solutions, and the like, which after having been so used, have been heat treated to an extent to cause substantial carbonization of carbonizable materials present and substantial driving off of volatile materials.

As an illustration of one adaptation of our invention, water from a polluted stream, containing ccloring, objectionable taste imparting, odoriferous and suspended materials, was pumped into a settling basin. During its passage to the basin, a clay of the character above noted, in this particular instance on Attapulgus clay, of a mesh of from 30 to 60, which previously had been used in a percolation filter through which a petroleum lubricating stock had been passed as a step in the refining of such stock, and which clay subsequently had been subjected to a burning operation to effect carbonization of carbonizable materials present and driving off substantial volatile matter, was added to the water in the proportion of from about ¼ to 2 grains of clay per gallon of water, by introducing the clay directly into the flowing stream of water. As the water to which clay had been added continued in its passage to the settling basin sufficient turbulence was encountered to cause substantially the entire volume of water to come into contact with the clay particles. In passing through the settling basin, the greater portion of the clay precipitated from the water, so that the latter upon reaching the overflow dam at the far end of the basin, was substantially clay free. To remove minute amounts of clay remaining therein, and as a further step in the treating process, the water was passed through a sand filter.

The water resulting from the above described treatment was clear, substantially improved as regards taste, content of coloring and suspended matter, and in addition, was enhanced from the standpoint of freedom from odor and bacteria.

While in the above example, the range of the amount of clay added was of the order stated, it is to be understood that such range may vary widely depending upon the particular water to be treated, the purity of water desired, and other such factors.

We have employed a number of burned clays which prior to burning had been used in the treatment of carbonizable materials, to determine their effect upon polluted water when the latter is brought into contact therewith by the procedure above stated. Such clays were of different meshes and of varying contents of carbon, such properties having been controlled respectively, by the crushing operations to which the materials, before and after their initial use, were subjected, and the temperatures, lengths of time and atmospheric conditions of the burning operation. We have found, in each instance, that such contacting had a definite purifying action upon the water. Some kinds of clays are more efficient than others, and the mesh of a particular clay as well as the purpose for which it had previously been used and the burning operations to which it had been subjected are factors bearing upon its efficiency.

It is to be understood that it is within the contemplation of our invention to employ in our process prepared clays treated with a carbonizable material and subsequently burned, rather than having to depend upon the supply of used or spent clays from the customary clay treating processes of industry as the sole source of the clays to be employed in our process. Where the carbonizable material employed to treat the clay is selected, and thereafter the burning operation controlled, materials of an even greater efficiency for the purification of water, may be prepared.

In general, in accordance with the present invention, we employ clays admixed with carbonized material by proceeding as above described, which mixture is of a mesh such that substantial contact between surfaces thereof and the water may be effected when small amounts of the mixture are introduced into a flowing stream of the water, which latter in its flow encounters substantial turbulence. For example, the aforesaid mixture may be of a mesh of from 30 to 60, or it may be coarser or finer. The mesh of a particular mixture as well as the amount thereof to be added per volume of water to be purified, are factors to be determined by test or trial in each particular case or set of circumstances.

What we claim is:

1. In the art of water purification, the step which consists in bringing into contact with a flowing stream of the water to be purified, substances consisting of burned clay and carbonized material.

2. In the art of water purification, the step which consists in passing into a flowing stream of the water to be purified, small amounts of substances consisting of burned clay and carbonized material.

3. In the art of water purification, the steps which comprise bringing into contact with a flowing stream of the water to be purified, substances consisting of burned clay and carbonized material and thereafter removing the clay and carbonized material from contact with the water.

4. In the art of water purification, the steps which comprise passing into a flowing stream of the water to be purified small amounts of substances consisting of burned clay and carbonized material, and thereafter removing the clay from contact with the water.

BRINTON RUSSELL.
CECIL B. RUSSELL.